(12) United States Patent
Witana

(10) Patent No.: US 6,922,564 B2
(45) Date of Patent: Jul. 26, 2005

(54) ADMITTING DATA FLOWS TO A MULTIPLE ACCESS NETWORK

(75) Inventor: Geetha Varuni Witana, Kings Langley (AU)

(73) Assignee: Motorola Inc., Schaumburg, IL (US)

( * ) Notice: Subject to any disclaimer, the term of this patent is extended or adjusted under 35 U.S.C. 154(b) by 41 days.

(21) Appl. No.: 10/449,345
(22) Filed: May 30, 2003
(65) Prior Publication Data
US 2004/0242235 A1 Dec. 2, 2004

(51) Int. Cl.[7] ................................................ H04Q 7/20
(52) U.S. Cl. .................... 455/452.2; 459/453; 370/230; 370/235
(58) Field of Search .......................... 455/452.1, 452.2, 455/453, 450, 509; 370/229, 230, 231, 232, 233, 234, 235, 352–356, 251–254

(56) References Cited

U.S. PATENT DOCUMENTS

| 6,216,006 | B1 |   | 4/2001 | Scholefield et al. |         |
|-----------|----|---|--------|--------------------|---------|
| 6,459,682 | B1 | * | 10/2002| Ellesson et al.    | 370/235 |
| 6,574,195 | B2 | * | 6/2003 | Roberts            | 370/235 |
| 2004/0062231 | A1 | * | 4/2004 | Wyatt         | 370/352 |

* cited by examiner

Primary Examiner—Jean Gelin
(74) Attorney, Agent, or Firm—Daniel K. Nichols; Matthew C. Loppnow

(57) ABSTRACT

A method, a network access point and a communication system are disclosed for admitting data flows corresponding to new service requests to a multiple access network. The method includes the steps of receiving a service request having Quality of Service (QoS) requirements from a network node (410), calculating the effective bandwidth required by a data flow corresponding to the service request based on an average packet size of the data flow (420), determining the maximum capacity of the network (430), and admitting the data flow corresponding to the service request (445) if the network has sufficient capacity to accommodate the effective bandwidth required by the data flow. The average packet size of a data flow corresponding to the service request can be determined from the service request for calculating the effective bandwidth required by the data flow. The maximum capacity of the network can be determined based on the number of transmitting nodes in the network. If the transmission rate of the service request is less than the maximum transmission rate of the network, the effective bandwidth required by the new data flow can be adjusted.

10 Claims, 4 Drawing Sheets

ADMITTING DATA FLOWS TO A MULTIPLE ACCESS NETWORK

FIELD OF THE INVENTION

The present invention relates generally to communication systems and networks and more particularly to multiple access networks.

BACKGROUND

Multiple access networks enable network operators to exploit the statistical multiplexing gain arising from a number of users sharing network resources. However, over-allocation of resources can lead to adverse operating conditions, such as unacceptably long delays. The provision of guaranteed Quality of Service (QoS) levels to data flows of higher priority than best effort data flows attempts to address this issue. Without admission control to prevent an overload of the high priority class, however, QoS guarantees cannot be provided or maintained. Thus, prioritized channel access must be coupled with admission control that limits the number of high priority flows.

Wireless Local Area Network (WLAN) technologies have seen an enormous growth in popularity and are currently being deployed in home, office and public access spaces, particularly as the last hop network. The growing popularity of streaming media applications and Voice over Internet Protocol (VoIP) requires such WLAN's to incorporate Quality of Service (QoS) support. QoS support is currently being standardized in the IEEE 802.11 standard for wireless networks. Two mechanisms will be supported, namely a simple, priority-based approach and a more complex, centralized scheduler based approach to be used where tight jitter control is required. Prioritized access to the network is implemented by using differentiated media access (MAC) protocol variables for the different priority flows, such that high priority flows gain access to the network in preference to low priority flows. Wide deployment of this simple mechanism is anticipated.

Admission control has been widely studied in the context of wide area networks such as Asynchronous Transfer Mode (ATM) and internet Protocol (IP) networks. However, such networks operate at high speeds over reliable wired or optical fiber links. At high transmission speeds, admission control can be non-optimally performed by conservatively allocating resources and reserving more bandwidth than is actually necessary to achieve satisfactory levels of QoS.

Wireless networks, on the other hand, have low transmission speeds and dynamic channel characteristics. Data reliability is usually of greater importance than delay and robust transmission link methods, such as forward error correction and automatic repeat request, are necessary. Consequently, results from studies relating to high-speed data networks cannot readily be applied to WLAN's or other networks exhibiting similar characteristics to WLAN's.

It is known in the art to employ an admission control function that uses a measurement-based approach for calculating the load on the network. The function makes admission control decisions on the basis of the calculated load. Admission control is dependent on the presence of a time stamp in each data packet for estimating delays. However, a timestamp is not available in a WLAN unless inserted by an application.

SUMMARY

Aspects of the present invention provide a method, a network access point and a communication system for admitting data flows corresponding to new service requests to a multiple access network. The method includes the steps of receiving a service request having Quality of Service (QoS) requirements from a network node, calculating the effective bandwidth required by a data flow corresponding to the service request based on an average packet size of the data flow, determining the maximum capacity of the network, and admitting the data flow corresponding to the service request if the network has sufficient capacity to accommodate the effective bandwidth required by the data flow.

The average packet size of the data flow is preferably determined from the service request and the effective bandwidth required by the data flow corresponding to the service request can optionally be adjusted if the transmission rate of the service request is less than the maximum transmission rate of the network. Preferably, if the number of transmitting nodes will increase due to the new data flow, the maximum capacity of the network is determined based on the number of transmitting nodes in the network.

In a preferred embodiment of the invention, the data flow corresponding to the service request is admitted to the network if the sum of the occupied bandwidth on the network and the effective bandwidth required by the data flow is less than or equal to the maximum capacity of the network.

It is further preferable to store and/or update the number of transmitting nodes and the occupied bandwidth of the network for future use when admitting other data flows. Similarly, the number of transmitting nodes and the occupied bandwidth of the network can be stored and/or updated when a data flow terminates.

Another aspect of the present invention provides a network access point for admitting a data flow to a multiple access data network. The apparatus includes a receiver for receiving a service request having Quality of Service (QoS) requirements from a network node, at least one processor for calculating an effective bandwidth required by the data flow corresponding to the service request based on an average packet size of the data flow and for determining a capacity of the network based on a number of transmitting nodes in the network, an admission controller for admitting the data flow relating to the service request to the network provided that the network has sufficient capacity to accommodate the effective bandwidth required by the data flow and a transmitter to transmit grant of admission to the network node.

Yet another aspect of the present invention provides a communication system, including a multiple access data network, a plurality of network nodes capable of communicating via the network and at least one access point coupled to the multiple access data network. An access point includes a receiver for receiving a service request having Quality of Service (QoS) requirements from a network node, at least one processor for calculating an effective bandwidth required by a dataflow corresponding to the service request based on an average packet size of the data flow and for determining a capacity of the network based on a number of transmitting nodes in the network, an admission controller for admitting to the network, the data flow relating to the service request provided that the network has sufficient capacity to accommodate the effective bandwidth required by the data flow and a transmitter to transmit grant of admission to the network node.

BRIEF DESCRIPTION OF THE DRAWINGS

Embodiments of the present invention are described hereinafter, by way of example only, with reference to the accompanying drawings in which.

DETAILED DESCRIPTION

For ease of explanation, a method, an apparatus and a system are described hereinafter with specific reference to a Wireless Local Area Network (WLAN). However, it is not intended that the embodiments of the present invention are so limited since the principles of the method and apparatus described hereinafter have general applicability to other kinds of networks that exhibit similar characteristics to WLAN's. For example, embodiments of the invention are also applicable to Home Phoneline Networking Alliance (HPNA) networks, which comprise wired networks possessing similar performance characteristics to WLAN's. Specifically, HPNA networks have a prioritized MAC, multiple transmission rates and a long preamble. Another example is HomePlug Powerline Alliance (HomePlug), which currently has no QoS support but which is likely to standardize on a similar QoS mechanism in the future. The method, apparatus and system described hereinafter have application to multi-class multiple-access LAN's incorporating QoS support.

Figure 1:
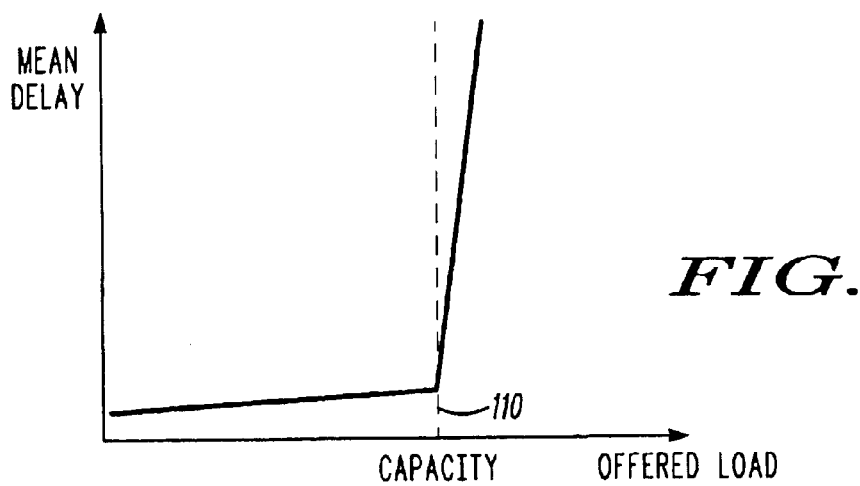
FIG. 1 is a graph showing typical performance characteristics of a WLAN.
Figure 2:
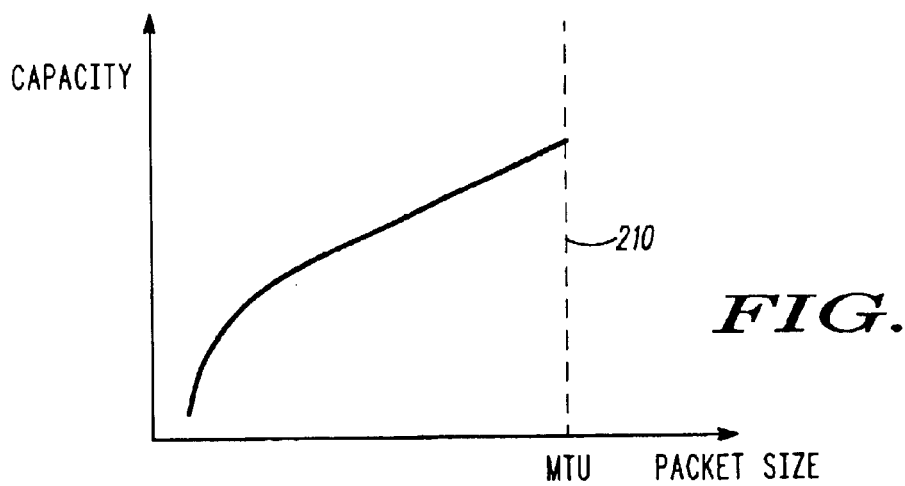
FIG. 2 is a graph showing the effect of data packet size on WLAN capacity.

A typical performance characteristic of a multiple access WLAN is shown in FIG. 1, which is a graph of mean delay as a function of offered load. As the offered load progressively increases, the mean delay increases gradually up until a threshold 110 (indicated by a vertical dotted line) is reached, after which the delay increases sharply (in a substantially vertical manner). The threshold 110 is referred to as the capacity of the network. As long as high priority traffic is restricted to within the network capacity, the QoS characteristics of the network are satisfactory or good, and the network is considered to be offering a controlled load service. A prioritized WLAN can thus prevent the best effort traffic from affecting high priority flows. Other QoS characteristics such as jitter are affected in a similar manner as mean delay. The purpose of admission control is to guarantee QoS by ensuring that the offered load remains below the capacity of the network. However, the network capacity is not constant, and the admission control algorithm and apparatus thus need to take variations in capacity into account. Network capacity is affected by the following factors:

The packet mix in the network. WLAN packets typically have long preambles due to the need to interoperate with nodes at different data rates. For small packets, the size of the preamble is of the same order of magnitude as the size of the actual data packets. Voice traffic has small packet sizes and consequently reduces the capacity of the network. Video traffic, on the other hand, has large packet sizes and thus increases the capacity of the network. The capacity of the network is therefore dependent on the average packet size or the packet mix in a WLAN. FIG. 2 is a graph showing WLAN capacity as a function of packet size. The capacity of the network increases non-linearly as the packet size increases, in a largely half-parabolic manner, until a maximum packet size 210 is reached. As can be seen, network capacity increases rapidly as a function of packet size for smaller packet sizes, but increases less rapidly as the average packet size increases and approaches the Maximum Transmitting Unit (MTU).

Figure 3:
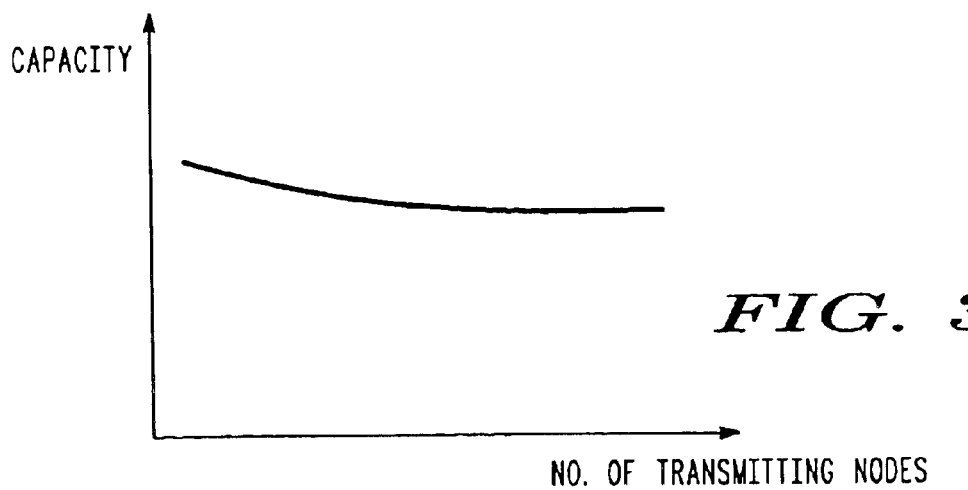
FIG. 3 is a graph showing the effect of the number of transmitting nodes on WLAN capacity.

The number of transmitting nodes in the network. The capacity of a WLAN is also affected by the number of transmitting nodes, due to an increase in the number of collisions as the number of transmitting nodes increases. FIG. 3 is a graph of network capacity as a function of the number of transmitting nodes. As can be seen from the graph, network capacity reduces when a constant load is offered by an increasing number of nodes. However, the graph is substantially more flat than FIG. 2, indicating that the number of transmitting nodes does not have as great an effect on network capacity as the effect of average packet size.

The physical transmission rate in a multi-rate WLAN. WLAN's support transmissions at various physical rates. Nodes transmit at different rates depending on factors such as link quality and the distance from the Access Point (AP). Transmitting at a lower rate than the maximum rate reduces the overall capacity of the network, as this results in the channel being occupied for a longer period of time. Thus, when a new data flow is requested, current values of factors affecting network capacity are obtained and compensated for. The compensation can be performed by reducing the network capacity, calculating an effective bandwidth for the new flow, or a combination thereof. A new data flow is only admitted if the network has sufficient capacity to accommodate the effective bandwidth required by the data flow.

Figure 4:
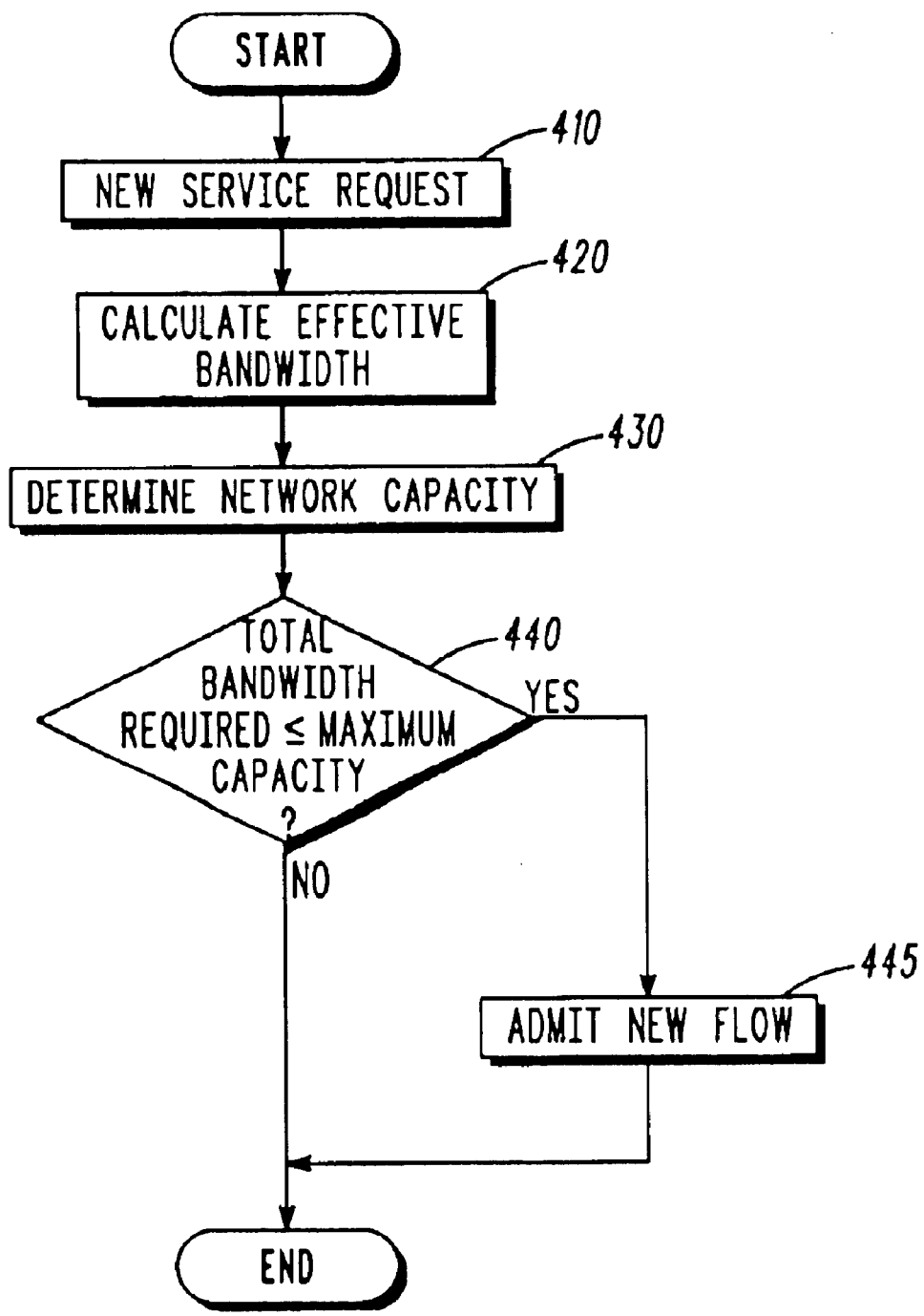
FIG. 4 is a flow diagram of a method for admission control of new traffic on a WLAN according to an embodiment of the present invention.

FIG. 4 shows a flow diagram of a method for admission control of new traffic on a WLAN.

At step 410, a service request for a new data flow is received from a WLAN node. The effective bandwidth for the new data flow is calculated at step 420. The capacity of the network is determined at step 430. At step 440, a determination is made whether the network has sufficient capacity to accommodate the effective bandwidth required by the new data flow. If so, (Y), the new data flow (service request) is admitted at step 445 and the process terminates. If the new data flow cannot be accommodated because of insufficient network capacity (N), the process terminates directly.

Figure 5:
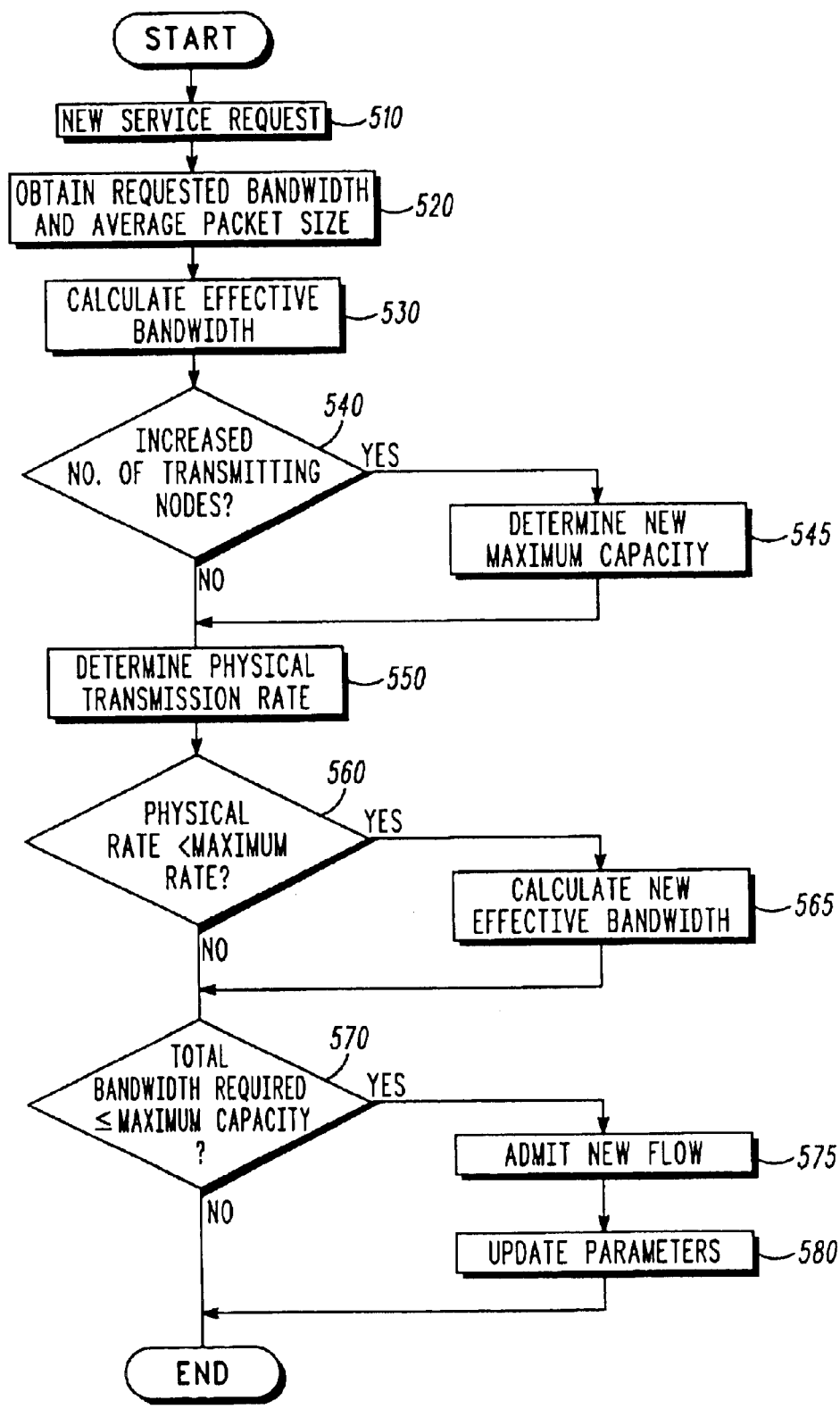
FIG. 5 is a flow diagram of a method for admission control of new traffic on a WLAN according to an embodiment of the present invention.

FIG. 5 shows a more detailed flow diagram of a method for admission control of new traffic on a WLAN.

At step 510, a service request for a new data flow is received from a WLAN node. The bandwidth requested in respect of the new data flow is determined from the QoS signaling between the requesting station and the WLAN admission controller, at step 520. At step 530, the effective bandwidth of the new data flow is calculated using the average packet size of the new data flow. The average packet size is obtained directly from the QoS signaling.

The effective bandwidth $BW_{eff}$ of the new data flow to compensate for the packet mix in the new data flow is:

$$BW_{eff} = (Size_{packet} + Size_{header})/Size_{packet} \cdot BW_{actual}$$

where:

$BW_{actual}$ is the requested bandwidth, $Size_{packet}$ is the average packet size, and $Size_{header}$ is the WLAN header size, which is a known constant for a particular network.

At step 540, a determination is made whether the new data flow increases the number of transmitting nodes. The number of transmitting nodess can be determined using the QoS signaling, which indicates the address of a transmitting node. If the number of transmitting nodes increases when the new data flow is added (Y), the new maximum capacity of the network is determined at step 545, before processing continues at step 550. Maximum network capacity as a function of the number of transmitting nodes is determined in advance by measurement or simulation. The relevant value for maximum capacity is typically obtained from a lookup table, based or indexed on the number of transmitting nodes. In the absence of an exact match in the lookup table, the next highest value in the table is selected. Table 1 provides an example of a lookup table for determining the maximum network capacity as a function of the number of transmitting nodes:

TABLE 1

| No. of TX Nodes | 1 | 2 | 3 |
|---|---|---|---|
| Max. Capacity (Mbps) | 11 | 10.8 | 10.6 |

If the number of transmitting nodes did not increase (N), processing continues from step 540 to step 550.

At step 550, the physical transmission rate of a data flow relating to the new service request is determined by means of a link monitor at the access point to the WLAN. Nodes can vary their transmitting rate periodically to deal with link conditions and station mobility. By having a link monitor continually sample packets from each node, variations in network capacity can be dynamically tracked by taking changes in physical rate into account. The link monitor obtains the physical rate from the WLAN headers.

At step 560, a determination is made of whether the physical rate is less than the maximum rate. If the physical transmission rate is less than the maximum rate determined in step 545 (Y), the effective bandwidth $BW_{eff}$ of the new data flow is determined according to the following formula, at an adjusting or calculating step 565:

$$BW_{eff} = BW_{eff} * (R_{max}/R_{actual})$$

where:

$BW_{eff}$ is the effective bandwidth at the maximum rate $R_{max}$, $R_{max}$ is the maximum rate, and $R_{actual}$ is the physical data rate.

From step 565, processing continues at step 570. If the physical rate is not less than the maximum rate (N), processing continues from step 560 to step 570.

At step 570, a determination is made whether the total bandwidth requirements of the already admitted flows (occupied capacity) and the new flow ($BW_{eff}$) is less than or equal to the maximum capacity of the network, which was determined at step 545. If so (Y), the new data flow (service request) is admitted at step 575 and the number of transmitting nodes and the new occupied bandwidth (capacity) are updated and stored at step 580. The new occupied capacity is equal to the sum of the previous occupied capacity and the effective bandwidth ($BW_{eff}$) of the new data flow. Processing then terminates following step 580. Otherwise, if step 570 returns false (N), processing terminates.

The admission controller updates its state in a similar fashion when data flows terminate, as to when new data flows are admitted to the network.

Figure 6:
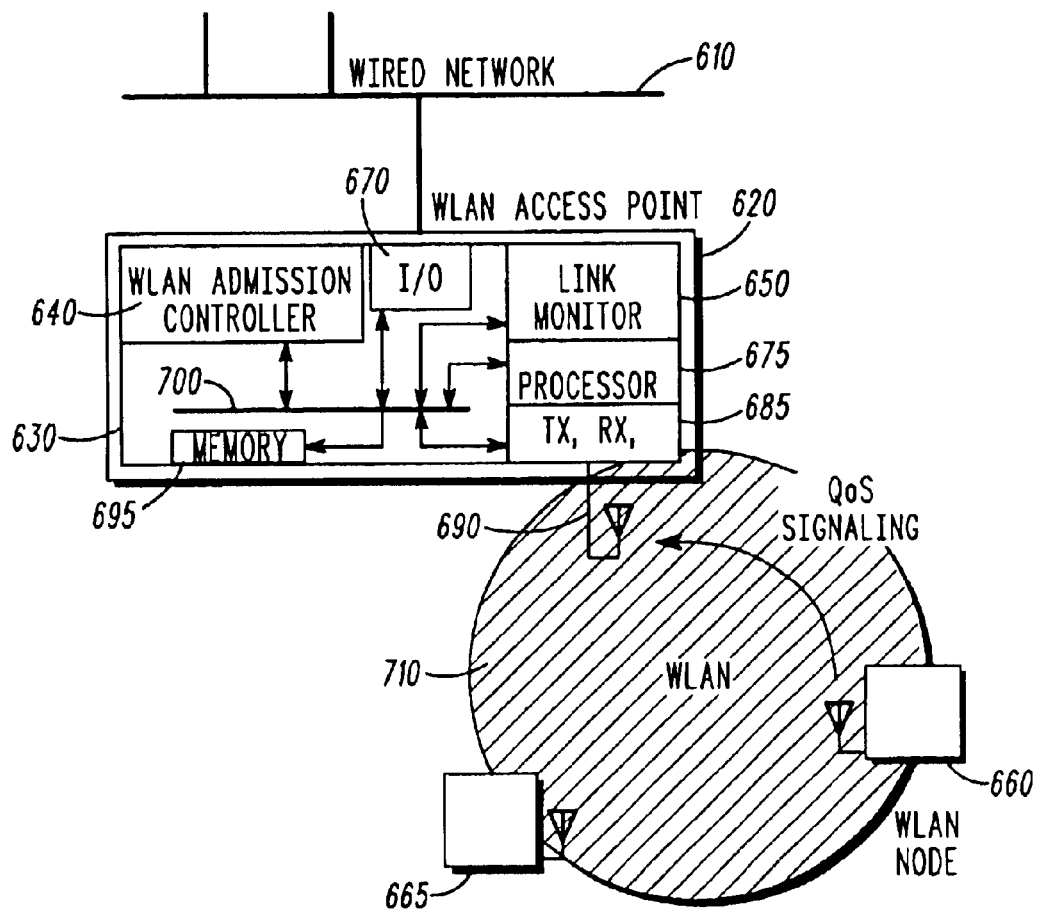
FIG. 6 is a block diagram of an architecture for implementation of the methods described hereinafter with reference to FIGS. 4 and 5.

FIG. 6 is a block diagram of an architecture with which the methods of FIGS. 4 and 5 may be practiced.

Referring to FIG. 6, a WLAN Access Point (AP) 620 is connected to a wired Loacl Area Network (LAN) 610 and provides wireless access to the LAN 610 for wireless nodes 660 and 665. While not depicted to simplify the drawing, it will be appreciated by those skilled in the art that other devices may be connected to the LAN 610, as indicated by branch lines. The WLAN AP 620 includes a Subnet Bandwidth Manager (SBM) 630, which includes a processor or computer 675 for executing software programs to perform functions such as calculations and data storage and retrieval and a transmitter and receiver (transceiver) 685 connected to an antenna 690 (typically an omnidirectional antenna) for communicating with the wireless nodes 660 and 665. The transceiver 685 in use provides for receiving the service request from a network node, such as nodes 660 and 665, the service request the having Quality of Service (QoS) requirements. The transceiver 685 also provides for a transmit grant of said admission to a network node such as nodes 660 and 665. The SBM 630 also includes a WLAN admission controller 640, a Link Monitor 650 (a monitoring unit for determining a transmission rate of the service request), a memory unit 695, for example formed from semiconductor random access memory (RAM) and/or read only memory (ROM), and an I/O interface 670 for connecting to wired LAN 610.

The processor 675 may be any processor an for instance it may be implemented using a IEEE 802.11 MAC processor or a wireless processor. Numerous other processors and processing units may be practiced without departing from the scope and spirit of the invention. The processor 685 provides for: determining average packet size; calculating the effective bandwidth required by the dataflow corresponding to the service request based on an average packet size of the data flow; and for determining a capacity of a Multiple Access data network in the form WLAN 710. Further, the processor 675 determines the capacity of WLAN 710 based on a number of transmitting nodes in the WLAN 710 if the number of transmitting nodes increases due to the data flow. Also, the admission controller 640, in use, provides for admitting to the WLAN 710, the data flow relating to the service request provided that the WLAN 710 has sufficient capacity to accommodate the effective bandwidth required by the data flow. The components 640, 650, 670, 675, 685 and 695 of the access point 620 communicate via an interconnected bus 700 and in a manner that results in a mode of operation known to those in the relevant art.

The wireless nodes 660 and 665 signal flow characteristics and QoS requirements to the SBM 630 using ReSerVation Protocol (RSVP). RSVP is typically used to request specific qualities of service from a network for particular application data streams or flows. An RSVP message contains a traffic specification, which specifies the bandwidth requirements as well the average packet size to be used by the QoS flow. The RSVP message also contains the address of the sending node. While other methods or protocols can be used for this purpose, RSVP is a standardized method for performing such signaling.

The method, network access point and communication system described hereinbefore provide a level of QoS to applications in multiple access networks that corresponds to a level of service comparable to that of a lightly loaded WLAN or a wired network that exhibits substantially similar characteristics to a WLAN. Thus, a prioritized WLAN or similar wired network incorporating an embodiment of the present invention can provide an impression of light loading to high priority traffic, even when overloaded with background best effort traffic. Such a service is desirable and suitable for supporting multimedia streaming applications and VoIP, amongst other types of data streams. However, the actual applications using the WLAN or similar wired network are assumed to provide sufficient buffering to deal with minor variations in QoS.

The detailed description provides a preferred exemplary embodiment only, and is not intended to limit the scope, applicability or configurations of the invention. Rather, the description of the preferred exemplary embodiment provides those skilled in the art with enabling descriptions for implementing the preferred exemplary embodiment of the invention. It should be understood that various changes may be made in the function and arrangement of elements without departing from the spirit and scope of the invention as set forth in the appended claims.

I claim:

1. A method for admitting a data flow corresponding to a new service request to a multiple access network, said method comprising the steps of:
    receiving from a network node a service request having Quality of Service (QoS) requirements;
    calculating an effective bandwidth required by said data flow corresponding to said service request based on an average packet size of said data flow;
    determining whether said data flow allows for an increase of a number of transmitting nodes in said network;
    determining a capacity of said network based on said number of transmitting nodes if said number of transmitting nodes increases;
    determining a transmission rate of said service request;
    adjusting said effective bandwidth to provide an adjusted effective bandwidth required by said data flow corresponding to said service request if said transmission rate of said service request is less than a maximum transmission rate of said network;
    admitting the data flow corresponding to said service request if said network has sufficient capacity to accommodate said adjusted effective bandwidth required by said data flow; and
    storing said number of transmitting nodes in the network and an occupied bandwidth of the network.

2. The method of claim 1, comprising the further steps of:
    determining a transmission rate of said service request; and
    adjusting said effective bandwidth required by said data flow corresponding to said service request if said transmission rate of said service request is less than a maximum transmission rate of the network.

3. The method of claim 1, wherein said data flow corresponding to said service request is admitted if the sum of the occupied bandwidth of said network and said effective bandwidth required by said data flow is less than or equal to a maximum capacity of said network.

4. The method of claim 1, including the further step of storing a number of transmitting nodes in the network and an occupied bandwidth of the network when said data flow terminates.

5. A network access point for admitting a data flow to a multiple access data network, comprising:
    a receiver for receiving a service request from a network node, said service request having Quality of Service (QoS) requirements;
    at least one processor for calculating an effective bandwidth required by said dataflow corresponding to said service request based on an average packet size of said data flow determined by said processor and the processor provides for determining a capacity of said network based on a number of transmitting nodes in said network if said number of transmitting nodes increases due to said data flow;
    a monitoring unit for determining a transmission rate of said service request, wherein said at least one processor adjusts said effective bandwidth required by said data flow corresponding to said service request if said transmission rate of said service request is less than a maximum transmission rate of said network;
    an admission controller for admitting to said network, said data flow relating to said service request provided that said network has sufficient capacity to accommodate said effective bandwidth required by said data flow;
    a transmitter to transmit grant of said admission to said network node; and
    a memory for storing a number of transmitting nodes in said network and an occupied bandwidth of said network.

6. The network access point of claim 5, wherein said admission controller admits said data flow corresponding to said service request if the sum of an occupied bandwidth of said network and said effective bandwidth required by said data flow is less than or equal to a maximum capacity of said network.

7. The network access point of claim 5, wherein said network comprises a wireless network.

8. A communication system, comprising:
    a multiple access data network;
    a plurality of network nodes capable of communicating via said network;
    at least one access point coupled to said multiple access data network, each said access point comprising:
        a receiver for receiving a service request from a network node, said service request having Quality of Service (QoS) requirements;
        at least one processor for calculating an effective bandwidth required by said dataflow corresponding to said service request based on an average packet size of said data flow determined by said processor and the processor provides for determining a capacity of said network based on a number of transmitting nodes in said network if said number of transmitting nodes increases due to said data flow;
    a monitoring unit for determining a transmission rate of said service request, wherein said at least one processor adjusts said effective bandwidth required by said data flow corresponding to said service request of said transmission rate of said service request is less than a maximum transmission rate of said network;

an admission controller for admitting to said network, said data flow relating to said service request provided that said network has sufficient capacity to accommodate said effective bandwidth required by said data flow;

a transmitter to transmit grant of said admission to said network node; and a memory for storing a number of transmitting nodes in said network and an occupied bandwidth of said network.

9. The communication system of claim 8, wherein said admission controller admits said data flow corresponding to said service request if the sum of an occupied bandwidth of said network and said effective bandwidth required by said data flow is less than or equal to a maximum capacity of said network.

10. The communication system of claim 8, wherein said network comprises a wireless network.

* * * * *